United States Patent
Yoon

(10) Patent No.: US 11,852,300 B2
(45) Date of Patent: Dec. 26, 2023

(54) HYDROGEN REFUELING STATION EVALUATION DEVICE AND CONTROL METHOD THEREOF

(71) Applicants: Hyundai Motor Company, Seoul (KR); Kia Corporation, Seoul (KR)

(72) Inventor: Aeun Yoon, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 68 days.

(21) Appl. No.: 17/512,670

(22) Filed: Oct. 28, 2021

(65) Prior Publication Data

US 2022/0307650 A1 Sep. 29, 2022

(30) Foreign Application Priority Data

Mar. 24, 2021 (KR) .......................... 10-2021-0038202

(51) Int. Cl.
*F17C 7/00* (2006.01)
*F17C 13/02* (2006.01)
*F17C 13/04* (2006.01)

(52) U.S. Cl.
CPC .............. *F17C 7/00* (2013.01); *F17C 13/025* (2013.01); *F17C 13/04* (2013.01); *F17C 2205/0332* (2013.01); *F17C 2205/0341* (2013.01); *F17C 2205/0388* (2013.01); *F17C 2221/012* (2013.01); *F17C 2223/033* (2013.01); *F17C 2227/044* (2013.01); *F17C 2250/043* (2013.01); *F17C 2250/0452* (2013.01); *F17C 2250/0636* (2013.01); *F17C 2260/038* (2013.01)

(58) Field of Classification Search
CPC ............................. F17C 7/00; F17C 2227/044
USPC ............................................................ 141/66
See application file for complete search history.

(56) References Cited

U.S. PATENT DOCUMENTS

| | | | | |
|---|---|---|---|---|
| 5,727,589 A | * | 3/1998 | Yokogi | F17C 7/00 141/85 |
| 5,749,389 A | * | 5/1998 | Ritrosi | B08B 9/0325 137/15.04 |
| 2006/0180240 A1 | * | 8/2006 | Niedzwiechi | B60P 3/24 141/82 |
| 2014/0216599 A1 | * | 8/2014 | Loewenthal | F17C 5/00 141/4 |

(Continued)

FOREIGN PATENT DOCUMENTS

KR 102070948 B1 4/2020

*Primary Examiner* — Reinaldo Sanchez-Medina
*Assistant Examiner* — Nicole Gardner
(74) *Attorney, Agent, or Firm* — Fox Rothschild LLP

(57) ABSTRACT

A hydrogen refueling station evaluation device includes a socket that is supplied with hydrogen, a hydrogen tank that stores the hydrogen supplied through the socket, and a discharge pipeline that discharges hydrogen from the hydrogen tank to the atmosphere. A discharge valve adjusts open and closed states of the discharge pipeline. A tank protection valve achieves a state in which the socket and the hydrogen tank are connected to each other, a state in which the socket and the discharge pipeline are connected to each other and the hydrogen tank is closed, and a state in which all of the socket, the hydrogen tank, and the discharge pipe are connected to one another. A gas supplier supplies an inert gas to the socket and a controller operates the tank protection valve, the discharge valve, and the gas supplier.

11 Claims, 3 Drawing Sheets

(56) References Cited

U.S. PATENT DOCUMENTS

2016/0116364 A1* 4/2016 Vaccaro .............. G01M 3/229
　　　　　　　　　　　　　　　　　　　　　　73/40.7
2020/0386369 A1* 12/2020 Ito .................... F17C 13/023

* cited by examiner

HYDROGEN REFUELING STATION EVALUATION DEVICE AND CONTROL METHOD THEREOF

CROSS REFERENCE TO RELATED APPLICATION

The present application claims priority to Korean Patent Application No. 10-2021-0038202, filed Mar. 24, 2021, the entire contents of which is incorporated herein for all purposes by this reference.

BACKGROUND OF THE DISCLOSURE

Field of the Disclosure

The present disclosure relates to an evaluation device for evaluating a hydrogen refueling station [YAE1] [Y2] that charges a vehicle, etc. with hydrogen.

Description of the Related Art

A hydrogen refueling station should satisfy international standard protocols and an evaluation device is used to check whether hydrogen refueling stations satisfy the protocols. The evaluation device is equipment that reproduces objects to be charged with hydrogen by a hydrogen refueling station, such as a hydrogen vehicle.

There is a possibility of hydrogen remaining in the evaluation device after a hydrogen refueling station is tested through the evaluation device and hydrogen has a property of generating hydrogen embrittlement that decreases strength since hydrogen changes a metallic lattice when it is absorbed in a metallic material. Further, remaining hydrogen may cause an error in hydrogen purity measurement in a later test on a hydrogen refueling station and may cause a safety accident, etc. when the evaluation device is improved or maintained. Accordingly, there is a need for a technology that can purge internal hydrogen.

The description provided above as a related art of the present disclosure is just for helping understanding the background of the present disclosure and should not be construed as being included in the related art known by those skilled in the art.

SUMMARY OF THE DISCLOSURE

An objective of the present disclosure is to provide a hydrogen refueling station evaluation device and a control method thereof that prevent deterioration of durability due to hydrogen embrittlement of an evaluation device for evaluating a hydrogen refueling station, that reduce the possibility of an error in a test result, and that enable the evaluation device to be more safely operated by effectively and sufficiently purging hydrogen remaining in the evaluation device.

In order to achieve the objectives, a hydrogen refueling station evaluation device of the present disclosure may include: a socket being supplied with hydrogen; a hydrogen tank storing the hydrogen supplied through the socket; a discharge pipeline provided to be able to discharge hydrogen from the hydrogen tank to the atmosphere; a discharge valve provided to adjust open and closed states of the discharge pipeline; a tank protection valve installed in an intake pipeline to transmit the hydrogen from the socket to the hydrogen tank, and configured to be able to achieve a state in which the socket and the hydrogen tank are connected to each other, a state in which the socket and the discharge pipeline are connected to each other and the hydrogen tank is closed, and a state in which all of the socket, the hydrogen tank, and the discharge pipe are connected to one another; a gas supplier provided to be able to supply an inert gas to the socket; and a controller configured to operate the tank protection valve, the discharge valve, and the gas supplier.

In the hydrogen refueling station evaluation device, a discharge pressure sensor configured to measure pressure of the discharge pipeline and a hydrogen concentration sensor may be disposed in the discharge pipeline; and the controller may be configured to receive signals from the discharge pressure sensor and the hydrogen concentration sensor. The gas supplier may include: a nozzle attachable to and detachable from the socket; a purging valve provided to adjust the amount of an inert gas that is supplied; and a purging pressure sensor configured to measure pressure of the inert gas that is supplied. A filter filtering out foreign substances from the inert gas may be disposed at the nozzle.

When a predetermined first purge mode is performed, the controller may be configured to operate the tank protection valve to connect the socket and the discharge pipeline to each other and close the hydrogen tank; open the purging valve and regulate and maintain the pressure of the inert gas that is supplied at a predetermined first reference pressure until the pressure of the discharge pipeline becomes the first reference pressure or less and hydrogen concentration of the discharge pipeline becomes predetermined first reference concentration or less; and may be configured to close the purging valve when the pressure of the discharge pipeline becomes the first reference pressure or less and the hydrogen concentration of the discharge pipe becomes the first reference concentration or less.

The controller may be configured to keep the purging valve open and an inert gas being supplied at the first reference pressure for a predetermined first reference time; keep the inert gas being supplied for a predetermined second reference time when the pressure of the discharge pipeline exceeds the first reference pressure after the first reference time elapses; and keep the inert gas being supplied for a predetermined third reference time when the hydrogen concentration of the discharge pipeline exceeds the first reference concentration although the pressure of the discharge pipeline becomes the first reference pressure or less.

When a predetermined second purge mode is performed, the controller may be configured to operate the tank protection valve to connect all of the socket, the hydrogen tank, and the discharge pipeline to one another; open the purging valve and regulate and maintain the pressure of the inert gas that is supplied at a predetermined second reference pressure until the pressure of the discharge pipeline becomes the second reference pressure or less and hydrogen concentration of the discharge pipeline becomes predetermined second reference concentration or less; and close the purging valve when the pressure of the discharge pipeline becomes the second reference pressure or less and the hydrogen concentration of the discharge pipe becomes the second reference concentration or less.

The controller may be configured to keep the purging valve open and an inert gas being supplied at the second reference pressure for a predetermined fourth reference time; keep the inert gas being supplied for a predetermined fifth reference time when the pressure of the discharge pipeline exceeds the second reference pressure after the fourth reference time elapses; and keep the inert gas being supplied for a predetermined sixth reference time when the hydrogen concentration of the discharge pipeline exceeds the second reference concentration although the pressure of the discharge pipeline becomes the second reference pressure or less.

In order to achieve the objectives, a method of controlling the hydrogen refueling station evaluation device of the present disclosure may include: operating the tank protection valve to connect a socket and a discharge pipeline to each other and close a hydrogen tank; opening the discharge valve; supplying an inert gas at a predetermined first reference pressure by opening the purging valve; and closing the purging valve when pressure of the discharge pipeline becomes the predetermined first reference pressure or less and hydrogen concentration of the discharge pipeline becomes predetermined first reference concentration or less.

The controller may be configured to keep the inert gas being supplied at the first reference pressure for a predetermined first reference time after the purging valve is opened; keep the inert gas being supplied for a predetermined second reference time when the pressure of the discharge pipeline exceeds the first reference pressure after the first reference time elapses; and keep the inert gas being supplied for a predetermined third reference time when the hydrogen concentration of the discharge pipeline exceeds the first reference concentration although the pressure of the discharge pipeline becomes the first reference pressure or less.

In order to achieve the objectives, a method of controlling the hydrogen refueling station evaluation device of the present disclosure may include: operating the tank protection valve to connect all of the socket, the hydrogen tank, and the discharge pipeline to one another; opening the discharge valve; supplying an inert gas at a predetermined second reference pressure by opening a purging valve; and closing the purging valve when pressure of the discharge pipeline becomes the predetermined second reference pressure or less and hydrogen concentration of the discharge pipeline becomes predetermined second reference concentration or less.

The controller may be configured to keep the inert gas being supplied at the second reference pressure for a predetermined fourth reference time after the purging valve is opened; keep the inert gas being supplied for a predetermined fifth reference time when the pressure of the discharge pipeline exceeds the second reference pressure after the fourth reference time elapses; and keep the inert gas being supplied for a predetermined sixth reference time when the hydrogen concentration of the discharge pipeline exceeds the second reference concentration although the pressure of the discharge pipeline becomes the second reference pressure or less.

According to the present disclosure, it is possible to prevent deterioration of durability due to hydrogen embrittlement of an evaluation device for evaluating a hydrogen refueling station, to reduce the possibility of an error in a test result, and to enable the evaluation device to be more safely operated by effectively and sufficiently purging hydrogen remaining in the evaluation device.

BRIEF DESCRIPTION OF THE DRAWINGS

The above and other objectives, features and other advantages of the present disclosure will be more clearly understood from the following detailed description when taken in conjunction with the accompanying drawings, in which.

DETAILED DESCRIPTION OF THE DISCLOSURE

Figure 1:
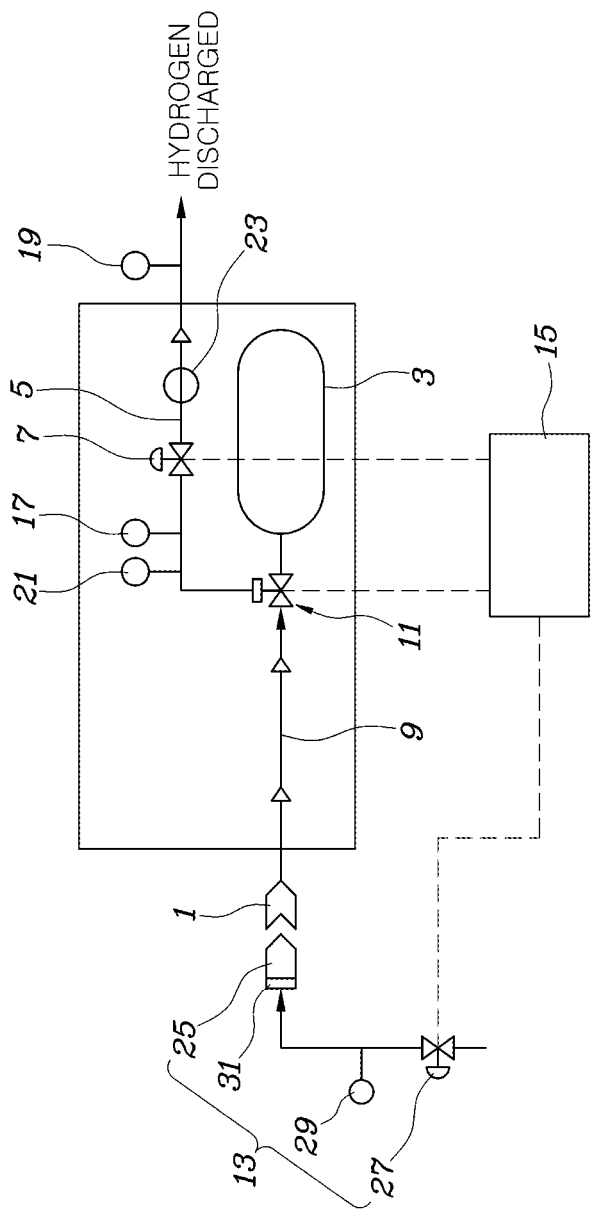
FIG. 1 is a diagram showing the configuration of a hydrogen refueling station according to the present disclosure.

In the following description, the structural or functional description specified to exemplary embodiments according to the concept of the present disclosure is intended to describe the exemplary embodiments, so it should be understood that the present disclosure may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present disclosure are not limited to the embodiments which will be described hereinbelow with reference to the accompanying drawings, but all of modifications, equivalents, and substitutions are included in the scope and spirit of the present disclosure.

It will be understood that, although the terms first and/or second, etc. may be used herein to describe various elements, these elements should not be limited by these terms. These terms are only used to distinguish one element, from another element. For instance, a first element discussed below could be termed a second element without departing from the right range of the present disclosure. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it should to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be interpreted in the same manner as those described above.

The terminology used herein is for the purpose of describing particular embodiments only and is not intended to limit the present disclosure Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless otherwise defined, all terms including technical and scientific terms used herein have the same meaning as commonly understood by those skilled in the art to which the present disclosure belongs. It must be understood that the terms defined by the dictionary are identical with the meanings within the context of the related art, and they should not be ideally or excessively formally defined unless the context clearly dictates otherwise.

The present disclosure will be described hereafter in detail by describing exemplary embodiments of the present disclosure with reference to the accompanying drawings. Like reference numerals given in the drawings indicate like components.

Referring to FIG. 1, an embodiment of a hydrogen refueling station evaluation device of the present disclosure may include: a socket 1 being supplied with hydrogen; a hydrogen tank 3 storing the hydrogen supplied through the socket 1; a discharge pipeline 5 to discharge the hydrogen from the hydrogen tank 3 to the atmosphere; a discharge valve 7 configured to adjust open and closed states of the discharge pipeline 5; a tank protection valve 11 installed in an intake pipeline 9 to transmit hydrogen from the socket 1 to the hydrogen tank 3, and configured to be able to achieve a state in which the socket 1 and the hydrogen tank 3 are connected to each other, a state in which the socket 1 and the discharge pipeline 5 are connected to each other and the hydrogen tank 3 is closed, and a state in which all of the socket 1, the hydrogen tank 3, and the discharge pipe 5 are connected to one another; a gas supplier 13 configured to supply an inert gas to the socket 1; and a controller 15 configured to operate the tank protection valve 11, the discharge valve 7, and the gas supplier 13.

In other words, according to the evaluation device of the present disclosure, the gas supplier 13 may be detachably connected to the socket 1 provided to supply hydrogen so that the inside of the evaluation device may be purged by a supplied inert gas. Further, the flowable range of the inflow inert gas may be adjusted by the tank protection valve 11 to purge the hydrogen in the evaluation device in various modes, if necessary. Accordingly, the problem of work for supplying an inert gas into an evaluation gas when purging hydrogen by directly supplying an inert gas to a pipeline in the evaluation device without using the socket 1 supplying hydrogen in the related art is solved. Further, the problem that hydrogen remaining in the section from the socket 1 to a check valve disposed in the internal pipeline is not purged well is solved.

A discharge pressure sensor 17 configured to measure the pressure of the discharge pipeline 5 and a hydrogen concentration sensor 19 may be disposed in the discharge pipeline 5, and the controller 15 may be configured to receive signals from the discharge pressure sensor 17 and the hydrogen concentration sensor 19. A temperature sensor 21, a flowmeter 23, etc. may be further disposed in the discharge pipeline 5.

The gas supplier 13 may include a nozzle 25 attachable to and detachable from the socket 1, a purging valve 27 configured to adjust the amount of an inert gas that is supplied, and a purging pressure sensor 29 configured to measure the pressure of the inert gas that is supplied. A filter 31 filtering out foreign substances from the inert gas may be disposed at the nozzle 25. Obviously, the gas supplier 13 is connected to a separate inert gas tank, etc. to be able to stably supply a sufficient amount of inert gas to the evaluation device through the nozzle 25.

The hydrogen refueling station evaluation device configured as described above may purge hydrogen therein in two different modes. A first purge mode, which is a mode used to keep the evaluation device for a relatively short period after the evaluation device is used, is a mode that necessarily maintains pressure of about 10 bar or less to determine whether there is leakage. For reference, the hydrogen tank 3 in the evaluation device is made of a carbon fiber reinforced plastic, so there is little possibility of hydrogen embrittlement.

Figure 2:
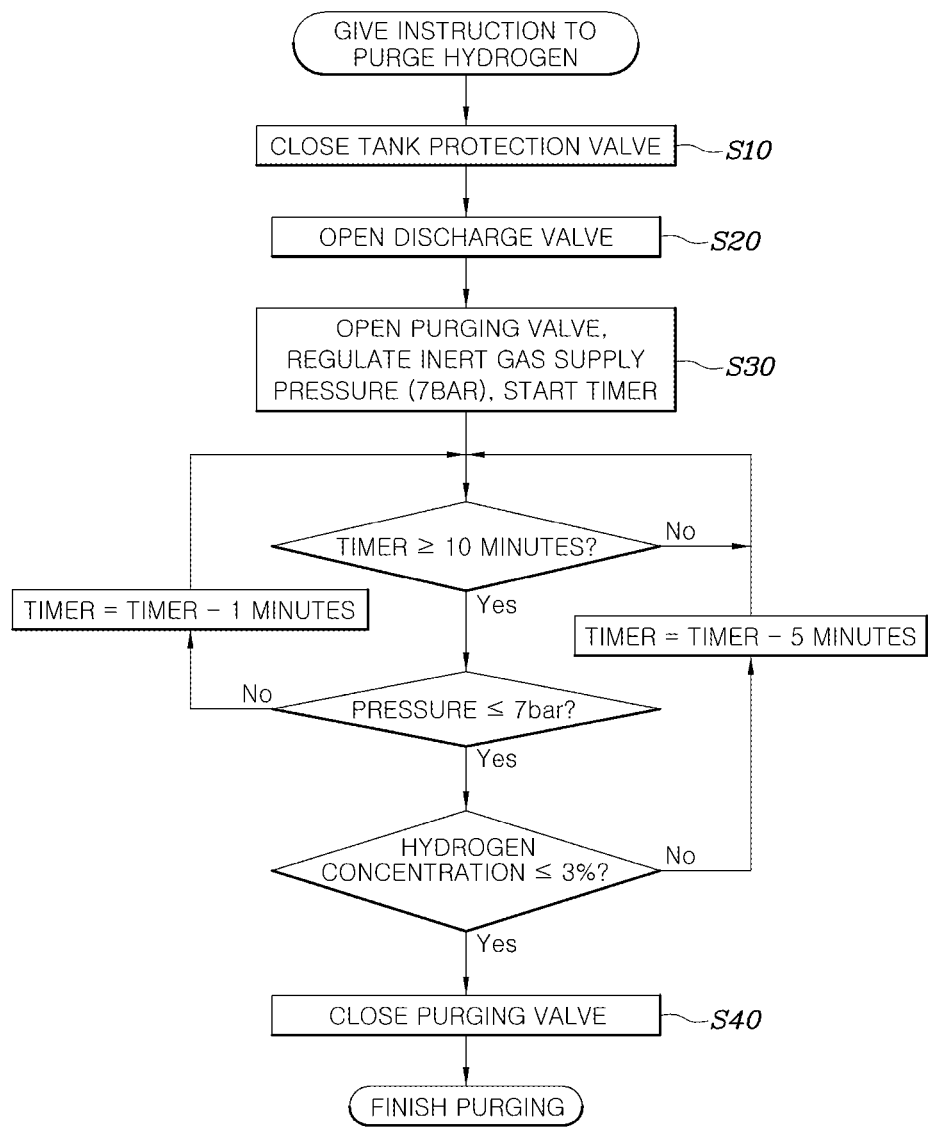
FIG. 2 is a flowchart showing a first embodiment of a method of controlling a hydrogen refueling station evaluation device according to the present disclosure.

When the first purge mode is performed, as shown in FIG. 2, the controller 15 may be configured to operate the tank protection valve 11 to connect the socket 1 and the discharge pipeline 5 to each other and close the hydrogen tank 3; open the purging valve 27 and regulate and maintain the pressure of the inert gas that is supplied at a predetermined first reference pressure until the pressure of the discharge pipeline 5 becomes the first reference pressure or less and the hydrogen concentration of the discharge pipeline 5 becomes predetermined first reference concentration or less; and close the purging valve 27 when the pressure of the discharge pipeline 5 becomes the first reference pressure or less and the hydrogen concentration of the discharge pipe 5 becomes the first reference concentration or less.

In other words, an inert gas may be injected through the socket 1 with the hydrogen tank 3 closed, thereby discharging the hydrogen in the section from the socket 1, which is the inlet for hydrogen, to the discharge pipeline 5 except the hydrogen tank 3 in the evaluation device. Accordingly, the working time may be reduced substantially in this mode, compared to when even the hydrogen in the hydrogen tank 3 is purged.

Obviously, when the pressure of the discharge pipeline 5 becomes the first reference pressure or less and the hydrogen concentration of the discharge pipeline 5 becomes the first reference concentration or less, the controller 15 may be configured to close the purging valve 27 and close the discharge valve 7 to thus maintain the pressure in the evaluation device and whether there is leakage may then be checked.

Accordingly, the first reference pressure may be determined as pressure suitable for the evaluation device so that whether there is leakage in the evaluation device may be checked, and for example, is set as 7 bar in FIG. 2. The first reference concentration may be, for example, set as 3% in consideration of the level at which hydrogen embrittlement is difficult to be generated by remaining hydrogen.

The controller 15 may be configured to keep the purging valve 27 open and an inert gas being supplied at the first reference pressure for a predetermined first reference time; keep the inert gas being supplied for a predetermined second reference time when the pressure of the discharge pipeline 5 exceeds the first reference pressure after the first reference time elapses; and keep the inert gas being supplied for a predetermined third reference time when the hydrogen concentration of the discharge pipeline 5 exceeds the first reference concentration although the pressure of the discharge pipeline 5 becomes the first reference pressure or less.

In other words, once hydrogen purging is started by the controller 15 opening the purging valve 27 and supplying the inert gas, the state may be maintained for the first reference time to perform purging sufficiently. Accordingly, the first reference time may be set as minimum time for which it is possible to statistically consider that purging was sufficiently performed, and is set as 10 minutes in FIG. 2.

After the first reference time elapses, the pressure and hydrogen concentration of the discharge pipeline 5 may be checked to make sure of purging. When the pressure of the discharge pipeline 5 exceeds the first reference pressure, the inert gas may be further supplied for the second reference time, thereby continuing purging. When the hydrogen concentration exceeds the first reference concentration even though the first reference pressure condition is satisfied, the inert gas may be further supplied for the third reference time, thereby continuing purging.

Accordingly, the second reference time and the third reference time may be determined on the basis of several times of test and analysis in terms of design in accordance with the purpose described above. In FIG. 2, for example, the second reference time is set as 1 minutes and the third reference time is set as 5 minutes. Meanwhile, the second purge mode is a mode for securing safety against a possibility of explosion, etc. by purging the hydrogen in the evaluation device as whole as possible for improvement, maintenance, etc. of the evaluation device after the evaluation device is used.

Figure 3:
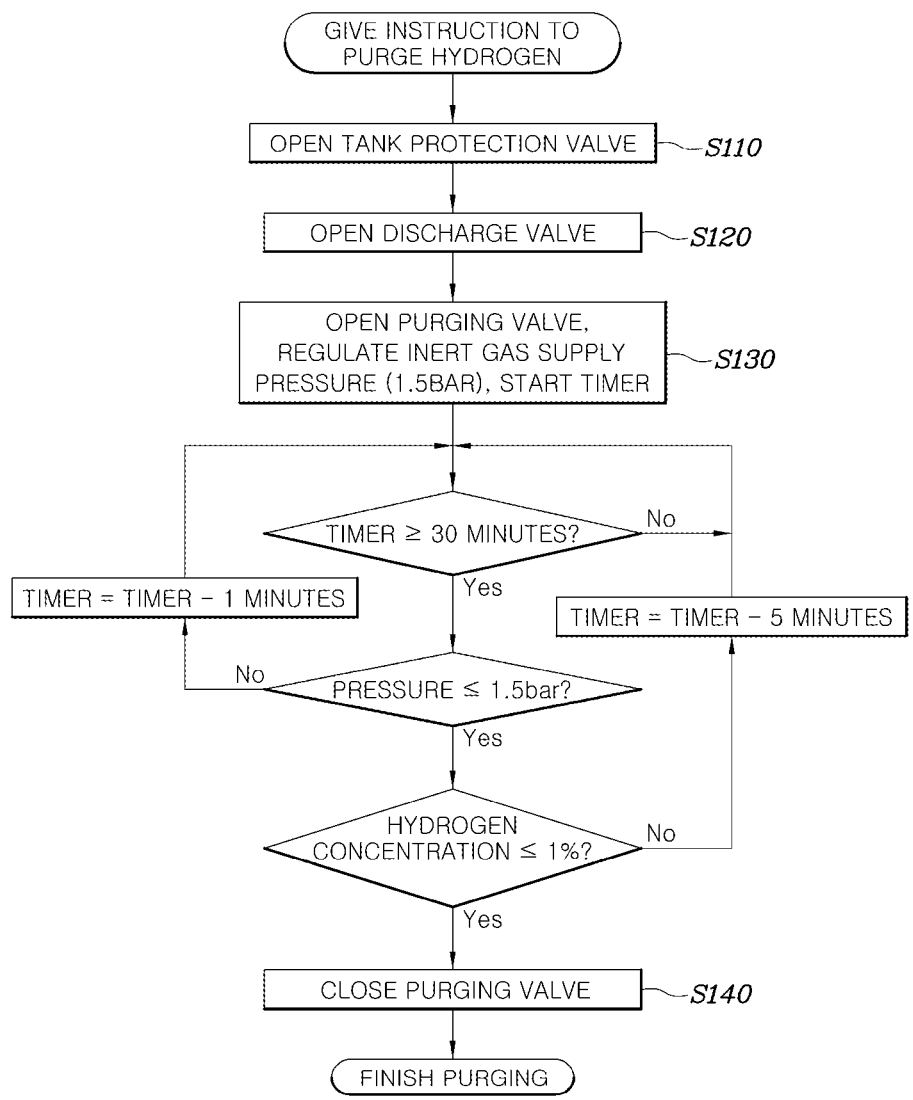
FIG. 3 is a flowchart showing a second embodiment of a method of controlling a hydrogen refueling station evaluation device according to the present disclosure.

When the second purge mode is performed, as shown in FIG. 3, the controller 15 may be configured to operate the tank protection valve 11 to connect all the socket 1, the hydrogen tank 3, the discharge pipeline 5 to one other; open the purging valve 27 and regulate and maintain the pressure of the inert gas that is supplied at a predetermined second reference pressure until the pressure of the discharge pipeline 5 becomes the second reference pressure or less and the hydrogen concentration of the discharge pipeline 5 becomes predetermined second reference concentration or less; and close the purging valve 27 when the pressure of the discharge pipeline 5 becomes the second reference pressure or less and the hydrogen concentration of the discharge pipe 5 becomes the second reference concentration or less.

In other words, an inert gas is injected through the socket 1 with all of the socket 1, the hydrogen tank 3, and the discharge pipeline 5 connected to one another so that the hydrogen at all places including the hydrogen tank 3 in the evaluation device is discharged. Accordingly, the second reference pressure may be set at a level higher than the atmospheric pressure but not too high and the second reference concentration may be set at a level at which it is possible to make sure that almost all hydrogen was substantially discharged. For example, the second reference time is set as 1.5 bar and the second reference concentration is set as 1%.

The controller 15 may be configured to keep the purging valve 27 open and an inert gas being supplied at the second reference pressure for a predetermined fourth reference time; keep the inert gas being supplied for a predetermined fifth reference time when the pressure of the discharge pipeline 5 exceeds the second reference pressure after the first reference time elapses; and keep the inert gas being supplied for a predetermined sixth reference time when the hydrogen concentration of the discharge pipeline 5 exceeds the second reference concentration although the pressure of the discharge pipeline 5 becomes the second reference pressure or less.

In other words, once hydrogen purging is started by the controller 15 opening the purging valve 27 and supplying the inert gas, the state may be maintained for the fourth reference time so that purging may be performed sufficiently. Accordingly, the fourth reference time may be set as minimum time for which it is possible to statistically consider that purging was sufficiently performed, and is set as 30 minutes in FIG. 3.

After the fourth reference time elapses, the pressure and hydrogen concentration of the discharge pipeline 5 may be checked to make sure of purging. When the pressure of the discharge pipeline 5 exceeds the second reference pressure, the inert gas may be further supplied for the fifth reference time, thereby continuing purging. When the hydrogen concentration exceeds the second reference concentration even though the second reference pressure condition is satisfied, the inert gas is further supplied for the sixth reference time, thereby continuing purging.

Accordingly, the fifth reference time and the sixth reference time may be determined on the basis of several times of test and analysis in terms of design in accordance with the purpose described above. In FIG. 3, for example, the fifth reference time is set as 1 minutes and the sixth reference time is set as 5 minutes.

A method of controlling the hydrogen refueling station evaluation device having the configuration described above may be expressed as follows. The method described herein below may be executed by the controller 15 described above. The method of the controlling the hydrogen refueling station evaluation device performing the first purge mode shown in FIG. 2 may include; operating the tank protection valve 11 to connect the socket 1 and the discharge pipeline 5 to each other and close the hydrogen tank 3 (S10); opening the discharge valve 7 (S20); supplying an inert gas at the predetermined first reference pressure by opening the purging valve 27 (S30); and closing the purging valve 27 when the pressure of the discharge pipeline 5 becomes the predetermined first reference pressure or less and the hydrogen concentration of the discharge pipeline 5 becomes the predetermined first reference concentration or less (S40).

The controller 15 may be configured to keep an inert gas being supplied at the first reference pressure for a predetermined first reference time after the purging valve 27 is opened; keep the inert gas being supplied for a predetermined second reference time when the pressure of the discharge pipeline 5 exceeds the first reference pressure after the first reference time elapses; and keep the inert gas being supplied for a predetermined third reference time when the hydrogen concentration of the discharge pipeline 5 exceeds the first reference concentration although the pressure of the discharge pipeline 5 becomes the first reference pressure or less.

Meanwhile, the method of the controlling the hydrogen refueling station evaluation device performing the second purge mode shown in FIG. 3 may include; operating the tank protection valve 11 to connect all of the socket 1, the hydrogen tank, and the discharge pipeline 5 to one another (S110); opening the discharge valve 7 (S120); supplying an inert gas at the predetermined second reference pressure by opening the purging valve 27 (S130); and closing the purging valve 27 when the pressure of the discharge pipeline 5 becomes the predetermined second reference pressure or less and the hydrogen concentration of the discharge pipeline 5 becomes the predetermined second reference concentration or less (S140).

The controller 15 may be configured to keep the inert gas being supplied at the second reference pressure for a predetermined fourth reference time after the purging valve 27 is opened; keep the inert gas being supplied for a predetermined fifth reference time when the pressure of the discharge pipeline 5 exceeds the second reference pressure after the first reference time elapses; and keep the inert gas being supplied for a predetermined sixth reference time when the hydrogen concentration of the discharge pipeline 5 exceeds the second reference concentration although the pressure of the discharge pipeline 5 becomes the second reference pressure or less.

Although the present disclosure was described with reference to specific embodiments shown in the drawings, it is apparent to those skilled in the art that the present disclosure may be changed and modified in various ways without departing from the scope of the present disclosure which is described in the following claims.

What is claimed is:

1. A hydrogen refueling station evaluation device, comprising:
    a socket supplied with hydrogen;
    a hydrogen tank that stores the hydrogen supplied through the socket;
    a discharge pipeline that discharges hydrogen from the hydrogen tank to the atmosphere;
    a discharge valve configured to adjust open and closed states of the discharge pipeline;
    a tank protection valve installed in an intake pipeline to transmit the hydrogen from the socket to the hydrogen tank, and configured to be able to achieve a state in which the socket and the hydrogen tank are connected to each other, a state in which the socket and the discharge pipeline are connected to each other and the hydrogen tank is closed, and a state in which all of the socket, the hydrogen tank, and the discharge pipe are connected to one another;
    a gas supplier configured to supply an inert gas to the socket; and
    a controller configured to operate the tank protection valve, the discharge valve, and the gas supplier;
    wherein a discharge pressure sensor configured to measure a pressure of the discharge pipeline and a hydrogen concentration sensor are disposed in the discharge pipeline;
    wherein the gas supplier includes:
        a purging valve configured to adjust the amount of the inert gas that is supplied; and
        a purging pressure sensor configured to measure pressure of the inert gas that is supplied; and
    wherein, when a predetermined first purge mode is performed, the controller is configured to:
        operate the tank protection valve to connect the socket and the discharge pipeline to each other and close the hydrogen tank;
        open the purging valve and regulate and maintain the pressure of the inert gas that is supplied at a predetermined first reference pressure until the pressure of the discharge pipeline becomes the first reference pressure or less and a hydrogen concentration of the discharge pipeline becomes a predetermined first reference concentration or less; and
        close the purging valve when the pressure of the discharge pipeline becomes the first reference pressure or less and the hydrogen concentration of the discharge pipe becomes the first reference concentration or less.

2. The hydrogen refueling station evaluation device of claim 1, wherein the controller is configured to receive signals from the discharge pressure sensor and the hydrogen concentration sensor.

3. The hydrogen refueling station evaluation device of claim 2, wherein the gas supplier includes a nozzle attachable to and detachable from the socket.

4. The hydrogen refueling station evaluation device of claim 3, wherein a filter configured to filter out foreign substances from the inert gas is disposed at the nozzle.

5. The hydrogen refueling station evaluation device of claim 1, wherein the controller is further configured to:
    keep the purging valve open and supply the inert gas at the first reference pressure for a predetermined first reference time;
    keep the inert gas being supplied for a predetermined second reference time when the pressure of the discharge pipeline exceeds the first reference pressure after the first reference time elapses; and
    keep the inert gas being supplied for a predetermined third reference time when the hydrogen concentration of the discharge pipeline exceeds the first reference concentration although the pressure of the discharge pipeline becomes the first reference pressure or less.

6. The hydrogen refueling station evaluation device of claim 1, wherein when a predetermined second purge mode is performed, the controller is further configured to:
    operate the tank protection valve to connect all of the socket, the hydrogen tank, and the discharge pipeline to one another;
    open the purging valve and regulate and maintain the pressure of the inert gas that is supplied at a predetermined second reference pressure until the pressure of the discharge pipeline becomes the second reference pressure or less and the hydrogen concentration of the discharge pipeline becomes a predetermined second reference concentration or less; and
    close the purging valve when the pressure of the discharge pipeline becomes the second reference pressure or less and the hydrogen concentration of the discharge pipe becomes the second reference concentration or less.

7. The hydrogen refueling station evaluation device of claim 6, wherein the controller is configured to:
    keep the purging valve open and supply the inert gas at the second reference pressure for a predetermined fourth reference time;
    keep the inert gas being supplied for a predetermined fifth reference time when the pressure of the discharge pipeline exceeds the second reference pressure after the fourth reference time elapses; and
    keep the inert gas being supplied for a predetermined sixth reference time when the hydrogen concentration of the discharge pipeline exceeds the second reference concentration although the pressure of the discharge pipeline becomes the second reference pressure or less.

8. A method of controlling hydrogen refueling station evaluation device, the method comprising:
    operating, by a controller, a tank protection valve to connect a socket and a discharge pipeline to each other and close a hydrogen tank;
    opening, by the controller, a discharge valve;
    supplying, by the controller, an inert gas at a predetermined first reference pressure by opening a purging valve; and closing, by the controller, the purging valve when a pressure of the discharge pipeline becomes the predetermined first reference pressure or less and a hydrogen concentration of the discharge pipeline becomes a predetermined first reference concentration or less.

9. The method of claim 8, further comprising:

keeping the inert gas being supplied at the first reference pressure for a predetermined first reference time after the purging valve is opened;

keeping the inert gas being supplied for a predetermined second reference time when the pressure of the discharge pipeline exceeds the first reference pressure after the first reference time elapses; and keeping the inert gas being supplied for a predetermined third reference time when the hydrogen concentration of the discharge pipeline exceeds the first reference concentration although the pressure of the discharge pipeline becomes the first reference pressure or less.

10. A method of controlling a hydrogen refueling station evaluation device, the method comprising:

operating, by a controller, a tank protection valve to connect all of a socket, a hydrogen tank, and a discharge pipeline to one another;

opening, by the controller, a discharge valve;

supplying, by the controller, an inert gas at a predetermined second reference pressure by opening a purging valve; and closing, by the controller, the purging valve when pressure of the discharge pipeline becomes the predetermined second reference pressure or less and a hydrogen concentration of the discharge pipeline becomes a predetermined second reference concentration or less.

11. The hydrogen refueling station evaluation device of claim 10, further comprising:

keeping the inert gas being supplied at the second reference pressure for a predetermined fourth reference time after the purging valve is opened;

keeping the inert gas being supplied for a predetermined fifth reference time when the pressure of the discharge pipeline exceeds the second reference pressure after the fourth reference time elapses; and keeping the inert gas being supplied for a predetermined sixth reference time when the hydrogen concentration of the discharge pipeline exceeds the second reference concentration although the pressure of the discharge pipeline becomes the second reference pressure or less.

* * * * *